United States Patent Office 2,761,850
Patented Sept. 4, 1956

2,761,850

PROCESS FOR THE PREPARATION OF CO-POLYMERS FROM LINSEED OIL AND STYRENE AND THE COPOLYMERS THUS PREPARED

Willem Johan Taat, Delft, Netherlands, assignor to Naamloze Vennootschap Scado Kunstharsindustrie, Zwolle, Netherlands, a corporation of the Netherlands No Drawing. Application January 28, 1953,
Serial No. 333,835

Claims priority, application Netherlands
February 11, 1952

4 Claims. (Cl. 260—23)

Co-polymers from styrene and drying oil are used, inter alia, as paint-binding agents and as raw materials for the preparation of alkyd resins.

These co-polymers can be prepared by heating the components for a long time. Heating can be carried out both in the presence of a solvent and without the use of a solvent. When no solvent is added, polymerization catalysts are preferably added, in particular organic peroxides have proved to be useful as such.

In performing these processes various difficulties arise, however. The co-polymers formed are often turbid and dry to turbid varnish films. Turbidity is connected with the percentage of styrene or styrene mixture, and only a limited quantity can be co-polymerized together with the oil. When the styrene is partly replaced by α methylstyrene, the percentages of styrene mixture, whereby clear products are still obtained, are, it is true, a little higher, but when working with the normal peroxidic catalysts, as for example benzoyl peroxide, it is not possible to add more than approx. 40% of styrene mixture to the oil, without turbid products being formed.

In the copending U. S. A. patent application No. 283,668, now abandoned, it has been suggested to effect co-polymerization in the presence of an organic peroxide with a high temperature of decomposition, which enables the formation of clear products with a high percentage of styrene or styrene mixture. A drawback of all the clear products obtained in these ways is, however, that the flow of the paints and varnish prepared with them is insufficient. In order to improve the flow-properties, instead of drying oil, pre-polymerized oil (standoil or bodied oil) can be copolymerized with styrene or styrene mixtures. As a result, however, the proportion of styrene or styrene mixture whereby clear products can still be obtained, is further decreased.

It was now found, that by preheating drying oil after the addition of a slight quantity of selenium, the nature of the oil is affected in such a way that it becomes an exceedingly suitable raw material for co-polymerization with styrene or mixtures of styrene and α methylstyrene, and that by this pre-treatment the percentage of styrene or styrene mixture which can be polymerized with the oil without yielding turbid products, is considerably higher than with non-pre-treated oil or oil which has been partially polymerized without the addition of selenium, while the products obtained have an excellent flow. With this heating the selenium is dissolved, presumably under formation of compounds.

It is known that selenium affects the cis-trans-isomerization of oleic acid.

Nothing could, however, raise the presumption that the oil would become more suitable as a raw material for styrene copolymerization by pre-treatment with selenium. When copolymerizing, this pre-treatment has the desired effect both with and without a solvent.

The use of the oil preheated in the presence of selenium, proved to have some more advantages if no solvent was added, for on co-polymerizing without solvent a smaller proportion of catalyst is sufficient than on using a non-pre-treated oil. Furthermore in this case, the heating time required for effecting copolymerization is shorter than if another oil component is taken as a starting material.

Preheating after the addition of selenium may, for instance, be carried out by heating the oil with 0.1% by weight of selenium at 240° C. for approx. 4 hours. At higher temperatures shorter heating-times are sufficient; at lower temperatures the times required for preheating are longer. Below 200° C. the velocity at which the oil is modified after the addition of selenium is so small, that preheating is fairly impracticable at this temperature.

The time required for preheating also depends on the way in which the following co-polymerization is carried out, and may differ as to whether or not a solvent is present. Also the nature and quantity of catalyst with which the following co-polymerization is carried out has an influence on the time required for preheating. If, for instance, one wishes to co-polymerize 55% by weight of linseed oil with 45% by weight of styrene without a solvent, with di-tertiary-butyl peroxide as catalyst, then 8 hours' preheating of the oil with selenium is not sufficient to obtain clear products if 0.45% of catalyst (calculated on styrene and oil) is used; with the use of 0.9% of catalyst, clear products are indeed obtained and with the use of 1.35% of catalyst 2 hours' preheating at the same temperature is already sufficient.

The preheating time also depends on the quantity of selenium with which it is carried out. With quantities of over 0.1%, however, the oil tends to discolour, which is undesirable for raw materials for varnish. At the same time the difficulty arises that this preheating should be carried out in such a way that the gaseous selenium-hydrogen compounds formed are carefully removed, since they cause an unbearable smell. At percentages far below 0.1% of selenium the preheating times become considerably longer and therefore preheating is preferably carried out with a quantity of selenium of 0.05 to 0.2% by weight, calculated for oil. In the appended table a few comparative tests of co-polymerization with unpreheated oil and oil preheated without and in the presence of selenium are given, whereby for the sake of comparing for every test the same heating scheme for the co-polymerization was assumed.

With every test the percentage of catalyst was 3% by weight of the quantity of styrene. The heating scheme was as follows:

Stage 1.—Heating the oil to 160–165° C. and adding the styrene (mixture), in which the catalyst has been dissolved, over a period of 6 hours';

Stage 2.—Gradually increasing the temperature to 250° C. over a period of 5 hours;

Stage 3.—Heating at 250° C. for 6 hours;

Stage 4.—Quickly raising the temperature to 300° C. and heating at this temperature for 4 hours.

It is true that these periods for working with the oil which has been preheated with selenium are unnecessarily long, but if in one case another heating scheme should be used than in the other, this could give rise to an incorrect interpretation of the observation results and a wrong interpretation of the conclusions to be drawn therefrom.

Table I

| Number | Pretreatment with 0.1% selenium | | Relative proportions of— | | | Catalyst | | Stage for sampling | Appearance of— | | Flow of varnish |
|---|---|---|---|---|---|---|---|---|---|---|---|
| | temp., °C. | time, hours | linseed oil, percent by weight | | styrene, percent by weight | α-methyl-styrene, percent by weight | type | Percent by wt. on mixture | | oil | Varnish film |
| 1a | | | standoil | 55 | 45 | | d. t. b. p. o.[1] | 1.35 | after stage 3 | opalescent | slightly turbid | good |
| 1b | | | standoil | 55 | 45 | | d. t. b. p. o.[1] | 1.35 | after stage 4 | slightly bid | turbid | Do. |
| 2a | | | linseed oil | 55 | 45 | | d. t. b. p. o.[1] | 1.35 | after stage 3 | clear | slightly opalescent | poor. |
| 2b | | | ___do___ | 55 | 45 | | d. t. b. p. o.[1] | 1.35 | after stage 4 | opalescent | ___do___ | Do. |
| 3a | 240 | 4 | ___do___ | 55 | 45 | | d. t. b. p. o.[1] | 1.35 | after stage 3 | clear | clear | good. |
| 3b | 240 | 4 | ___do___ | 55 | 45 | | d. t. b. p. o.[1] | 1.35 | after stage 4 | ___do___ | ___do___ | Do. |
| 4a | 240 | 8 | ___do___ | 40 | 60 | | d. t. b. p. o.[1] | 1.8 | after stage 3 | ___do___ | ___do___ | Do. |
| 4b | 240 | 8 | ___do___ | 40 | 60 | | d. t. b. p. o.[1] | 1.8 | after stage 4 | ___do___ | ___do___ | Do. |
| 5a | 240 | 4 | ___do___ | 55 | 31.5 | 13.5 | benzoylperoxide | 1.35 | after stage 3 | ___do___ | ___do___ | Do. |
| 5b | 240 | 4 | ___do___ | 55 | 31.5 | 13.5 | ___do___ | 1.35 | after stage 4 | ___do___ | slightly opalescent | Do. |
| 6a | 240 | 8 | ___do___ | 45 | 38.5 | 16.5 | ___do___ | 1.65 | after stage 3 | turbid | turbid | Do. |
| 7a | | | ___do___ | 75 | 17.5 | 7.5 | ___do___ | 0.75 | after stage 4 | slightly turbid | ___do___ | moderate. |
| 8a | | | ___do___ | 75 | 21.25 | 3.75 | ___do___ | 0.75 | after stage 3 | ___do___ | slightly hazy | Do. |
| 8b | | | ___do___ | 75 | 21.25 | 3.75 | ___do___ | 0.75 | after stage 4 | turbid | dimmed | Do. |

[1] d. t. b. p. o. = ditertiarybutylperoxide.

From tests 1a to 4b it appears that with preheated oil to which selenium has been added a much higher percentage of styrene is able to co-polymerize with the oil to clear products than is possible without this preheating, while better flowing products are obtained than with non-preheated oil. On the other hand, by the use of larger quantities of styrene the flow is generally unfavourably affected. On comparing tests 1a and b with 3 and 4a and b the considerable advantage of the use of preheated oil to which selenium has been added over the use of bodied oil, which has consequently been heated without the addition of selenium, is also apparent.

From tests 5a to 8b, whereby benzoylperoxide was used as catalyst, it appears that also with mixtures of styrene and α methylstyrene and a catalyst which is decomposed at a lower temperature, preheating of the oil after the addition of selenium gives proportionally the same advantages.

Finally it may be remarked that when 55% by weight of non-pretreated linseed oil and 45% by weight of styrene with di-tertiary-butyl peroxide as catalyst are taken as starting material, 1.35% of catalyst (percent by weight on oil plus styrene) is required for co-polymerization and that the products obtained are not perfectly clear; with smaller quantities of catalyst highly turbid products are formed. With oil, pretreated by heating after selenium has been added and furthermore co-polymerizing in the same way, products which are not yet perfectly clear are obtained with 0.5% of this catalyst, if preheating consists in 8 hours' heating after the addition of 0.1% of selenium at 240° C. However, with the use of 0.65% of catalyst, co-polymerization proceeds entirely in the manner desired.

As stated before, the heating timed with the use of oil pre-heated after addition of selenium, may be shorter than with the use of untreated linseed oil. Thus it proved to be possible to obtain good, clear products by preheating linseed oil after the addition of 0.1% of selenium at 250° C. for 4 hours, heating this product with 1.35% of di-tertiary-butyl peroxide (percent by weight, calculated on oil and styrene together) as catalyst, gradually adding the styrene to the oil in approx. 2 hours at 165° C., raising the temperature from 165° C. to 300° C. over a period of 3 hours and keeping it at 300° C. for 3 hours.

The whole heating period, inclusive of preheating, consequently amounts to 12 hours only, as compared with 22 hours when working with non-pretreated oil. It is clear that, under these circumstances, the production capacity of an existing installation can be considerably extended.

I claim:

1. A process of copolymerizing linseed oil with styrene to form clear polymers which dry to clear films, comprising the steps of heating linseed oil at a temperature above 200° C. with 0.05–0.2% by weight of selenium; and copolymerizing the thus selenium-treated linseed oil with styrene so as to form a clear copolymer of said linseed oil and styrene which upon drying forms a clear film.

2. A process of copolymerizing linseed oil with styrene to form clear polymers which dry to clear films, comprising the steps of heating linseed oil at a temperature of about 240° C. for about 4 hours with about 0.1% by weight of selenium; and copolymerizing the thus selenium-treated linseed oil with styrene so as to form a clear copolymer of said linseed oil and styrene which upon drying forms a clear film.

3. A process of copolymerizing linseed oil with styrene to form clear polymers which dry to clear films, comprising the steps of heating linseed oil at a temperature above 200° C. with about 0.05–0.2% by weight of selenium; and copolymerizing the thus selenium-treated linseed oil with styrene in the presence of an organic peroxide as catalyst so as to form a clear copolymer of said linseed oil and styrene which upon drying forms a clear film.

4. The product of the process of claim 1.

References Cited in the file of this patent

UNITED STATES PATENTS

| 2,152,642 | Harper | Apr. 4, 1939 |
| 2,165,530 | Bertram | July 11, 1939 |
| 2,392,710 | Wakeford et al. | Jan. 8, 1946 |